(12) United States Patent
Li

(10) Patent No.: US 9,256,959 B1
(45) Date of Patent: Feb. 9, 2016

(54) SYSTEMS AND METHODS FOR COLOR LENS SHADING CORRECTION

(71) Applicant: Marvell International Ltd., Hamilton (BM)

(72) Inventor: Hongxin Li, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/445,131

(22) Filed: Jul. 29, 2014

Related U.S. Application Data

(60) Provisional application No. 61/871,631, filed on Aug. 29, 2013.

(51) Int. Cl.
*G06K 9/00* (2006.01)
*G06T 7/40* (2006.01)

(52) U.S. Cl.
CPC ........................................ *G06T 7/408* (2013.01)

(58) Field of Classification Search
None
See application file for complete search history.

(56) References Cited

U.S. PATENT DOCUMENTS

| | | | | |
|---|---|---|---|---|
| 7,391,450 | B2* | 6/2008 | Pinto | G06T 5/006 348/251 |
| 7,834,921 | B1* | 11/2010 | Pinto | G06T 5/006 348/251 |
| 8,194,159 | B2* | 6/2012 | Wang | H01L 27/14625 348/251 |
| 8,836,716 | B1* | 9/2014 | Gaddy | H04N 9/67 345/591 |
| 2005/0047653 | A1* | 3/2005 | Matthews | H04N 1/6005 382/167 |
| 2006/0126933 | A1* | 6/2006 | Porikli | G06K 9/38 382/173 |
| 2012/0008019 | A1* | 1/2012 | Zhang | G06K 9/00791 348/251 |

OTHER PUBLICATIONS

Young "Shading correction: Compensation for illumination and sensor inhomogeneities", Curr. Protoc. Cytom., ch. 2, pp. 1 -14 May 2001.*

* cited by examiner

*Primary Examiner* — Feng Niu

(57) ABSTRACT

System and methods are provided for performing color lens shading correction. A plurality of mesh points are generated. Mesh gain parameters associated with the mesh points are determined. The mesh gain parameters are applied to an input image for color lens shading correction. A color entropy related to color distribution of the corrected input image is obtained. The mesh gain parameters are adjusted to reduce the color entropy.

20 Claims, 8 Drawing Sheets

SYSTEMS AND METHODS FOR COLOR LENS SHADING CORRECTION

CROSS-REFERENCE TO RELATED APPLICATIONS

This disclosure claims priority to and benefit from U.S. Provisional Patent Application No. 61/871,631, filed on Aug. 29, 2013, the entirety of which is incorporated herein by reference.

FIELD

The technology described in this patent document relates generally to data processing and more particularly to image processing.

BACKGROUND

In an image, a particular pixel can be represented in a RGB color space as follows:

$$R(x,y) = \int I(x,y,z) \times C_R(\lambda) d\lambda$$

$$G(x,y) = \int I(x,y,z) \times C_G(\lambda) d\lambda$$

$$B(x,y) = \int I(x,y,z) \times C_B(\lambda) d\lambda \quad (1)$$

where R, G and B represent pixel values of the pixel, x and y represent horizontal and vertical position values of the pixel, and $C_R(\lambda)$, $C_G(\lambda)$, and $C_B(\lambda)$ represent transmission responses of R, G, B color filters in an image-capturing device (e.g., a camera).

Lens shading effects often occur in an image-capturing device (e.g., a camera). One common lens shading effect involves color non-uniformity in an image. That is, a same color in reality becomes different colors at a center of a captured image and at a corner of the captured image. The color lens shading effect is often caused by, for example, optical cross-talk, defective infrared filter, etc.

Considering the color lens shading (CLS) effects, the pixel values of the pixel can be determined as follows:

$$R(x,y) = \int I(x,y,z) \times C_R(\lambda) \times CLS(\lambda, \alpha(x,y)) d\lambda$$

$$G(x,y) = \int I(x,y,z) \times C_G(\lambda) \times CLS(\lambda, \alpha(x,y)) d\lambda$$

$$B(x,y) = \int I(x,y,z) \times C_B(\lambda) \times CLS(\lambda, \alpha(x,y)) d\lambda \quad (1)$$

where $CLS(\lambda, \alpha(x, y))$ represents a CLS gain function, and $\alpha$ represents an incident angle that is a function of pixel position.

A CLS gain is determined as follows:

$$Gain_X(x, y) = \frac{\int I(x, y, \lambda) \times C_X(\lambda) \times CLS(\lambda, \alpha(x, y)) \cdot d\lambda}{\int I(x, y, \lambda) \times C_X(\lambda) \cdot d\lambda} \quad (2)$$

where X represents a R channel, a G channel, or a B channel.

SUMMARY

In accordance with the teachings described herein, system and methods are provided for performing color lens shading correction. A plurality of mesh points are generated. Mesh gain parameters associated with the mesh points are determined. The mesh gain parameters are applied to an input image for color lens shading correction. A color entropy related to color distribution of the corrected input image is obtained. The mesh gain parameters are adjusted to reduce the color entropy.

In one embodiment, a method is provided for performing color lens shading correction. A plurality of original correction curves are generated through calibration. The plurality of original correction curves are applied to an input image to obtain one or more color entropies, a color entropy being associated with color distribution of the input image. A first original correction curve is determined based at least in part on the color entropies. Color lens shading correction is performed based at least in part on the first original correction curve.

In another embodiment, a system for performing color lens shading correction includes one or more data processors and a computer-readable storage medium encoded with instructions for commanding the data processors to execute certain operations. A plurality of mesh points are generated. Mesh gain parameters associated with the mesh points are determined. The mesh gain parameters are applied to an input image for color lens shading correction. A color entropy related to color distribution of the corrected input image is obtained. The mesh gain parameters are adjusted to reduce the color entropy.

In yet another embodiment, a system for performing color lens shading correction includes one or more data processors and a computer-readable storage medium encoded with instructions for commanding the data processors to execute certain operations. For example, A plurality of original correction curves are generated through calibration. The plurality of original correction curves are applied to an input image to obtain one or more color entropies, a color entropy being associated with color distribution of the input image. A first original correction curve is determined based at least in part on the color entropies. Color lens shading correction is performed based at least in part on the first original correction curve.

DETAILED DESCRIPTION

Different models have been implemented (e.g., in image sensor pipeline processing) for reducing color lens shading (CLS) effects. For example, a model assumes that a CLS gain of a particular pixel depends on the pixel position and the color channels, but does not depend on incident light on the pixel. This model often does not work well for different scenes or different ambient lights.

Another model assumes that a CLS gain of a pixel depends on the pixel position, the color channels and the spectrum of ambient light, where ambient light can be estimated using an automatic white balance (AWB) unit. However, this model may have certain problems. For example, AWB estimation and CLS correction often depends on each other in an image processing pipeline, and may cause oscillation because of the mutual dependency. In addition, some other approaches for reducing CLS effects, such as calibration of camera modules one by one and addition of a blue glass in front of a camera, may involve high costs and limited effects.

Figure 1:
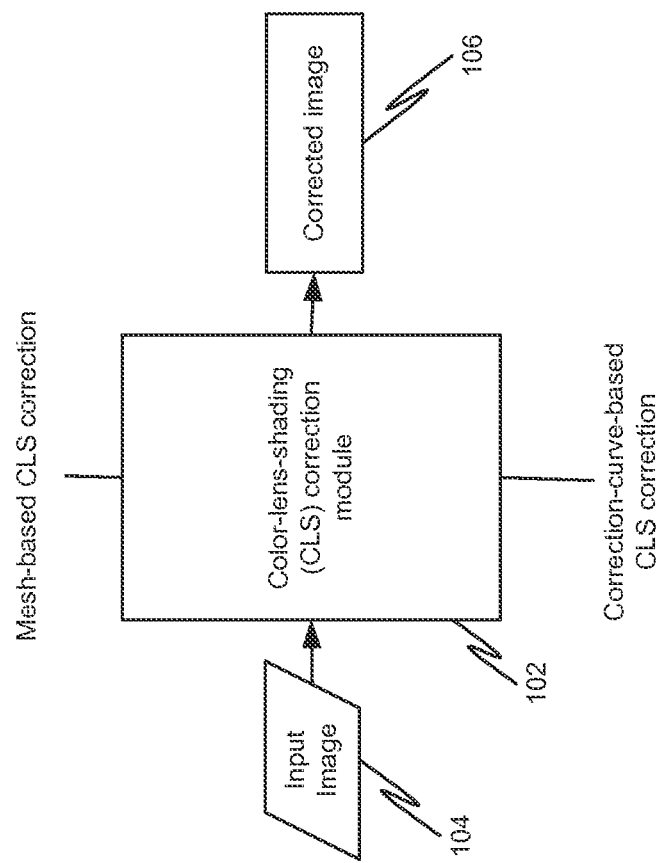
FIG. 1 depicts an example diagram for a CLS correction system.

FIG. 1 depicts an example diagram for a CLS correction system. As shown in FIG. 1, a CLS correction module 102 receives an input image 104 and performs CLS correction to obtain a corrected image 106. The CLS correction module 102 performs mesh-based CLS correction or correction-curve-based CLS correction.

The mesh-based CLS correction uses a color entropy related to color distribution of an image. For example, a denser color distribution results in a smaller color entropy. CLS effects often introduce different color shifts at the center of an image and at the corners of the image, and thus tend to increase color entropy. Better CLS correction may be achieved by reducing (e.g., minimizing) the color entropy.

Specifically, pixel values of a particular pixel in the input image 104 correspond to (r, g, b) in a RGB space. A horizontal coordinate and a vertical coordinate in a chromatic space are determined to be $x=f1(r/g)$ and $y=f2(b/g)$, respectively, where f1 and f2 represent two functions. For example, f1 and f2 both correspond to a logarithm function. Then, a pixel cloud may be generated for the input image 104 in the chromatic space.

If most of the pixel cloud locates in a rectangle of $x \in (x_{min}, x_{max})$ and $y \in (y_{min}, y_{max})$, then the rectangle is divided into M*N grids. A two-dimensional chromatic histogram for the input image 104 is calculated based on the M*N grids. A color presence probability that corresponds to an $i^{th}$ row and a $j^{th}$ column of the M*N grids is calculated as $P_{i,j}$. A two-dimensional color entropy is determined as follows:

$$CE_{2D}(I) = - \sum_{\substack{i \in [1,M] \\ j \in [1,N]}} P_{i,j} \cdot \log(P_{i,j}) \qquad (3)$$

In addition, a one-dimensional color entropy is determined as follows:

$$CE_{1D}(I) = - \sum_{i \in [1,M]} P'_i \cdot \log(P'_i) - \sum_{j \in [1,N]} Q_j \cdot \log(Q_j) \qquad (4)$$

where $P'_i$ represents a color presence probability associated with r/g, and $Q_j$ represents a color presence probability associated with b/g.

The mesh-based CLS correction begins with generating a plurality of mesh points. One or more mesh gain parameters are determined. The mesh gain parameters are applied to the input image 104 for CLS correction, and a color entropy related to color distribution of the corrected image 106 is obtained. The mesh gain parameters are adjusted to reduce the color entropy for better CLS correction.

Specifically, an N-point mesh (e.g., in a grid pattern, in a circle pattern, etc.) is defined. For each mesh point, a mesh gain parameter for a green channel is fixed to 1.0. Mesh gain parameters for a red channel and a blue channel are kept as variable parameters. Thus, a vector with 2*N mesh gain parameters can be determined as follows:

$$v=(rgain(1),bgain(1),rgain(2),bgain(2),\ldots rgain(N), bgain(N)) \qquad (5)$$

where v represents the vector, rgain represents the mesh gain parameter for the red channel, and bgain represents the mesh gain parameter for the blue channel. The N-point mesh can be denoted as Mesh(v).

An interpolation is performed based on the mesh gain parameters to obtain channel gain parameters for an entire image related to the mesh. Various interpolation methods may be implemented, e.g., bi-linear interpolation, bi-cubic interpolation, B-spline interpolation, or other suitable methods.

The channel gain parameters are applied to the input image 104 to obtain a corrected image 106 as follows:

$$I'(x,y)=I(x,y)\times \text{interpolate}(\text{Mesh}(v)) \qquad (6)$$

where I' represents the corrected image 106, I represents the input image 104, and interpolate(Mesh(v)) represents the channel gain parameters. In addition, "×" represents multiplication for each color channel. Furthermore, a color entropy, CE(I') for the corrected image 106 is obtained. For example, the color entropy for the corrected image 106 corresponds to the vector v.

Various methods may be implemented to reduce the color entropy for better CLS correction. For example, a Newton's method is used for reducing (e.g., minimizing) the color entropy to obtain an optimal color entropy, v_opt. A CLS correction map can be generated through interpolation based on a new mesh obtained using the optimal color entropy, Mesh(v_opt).

Figure 2:
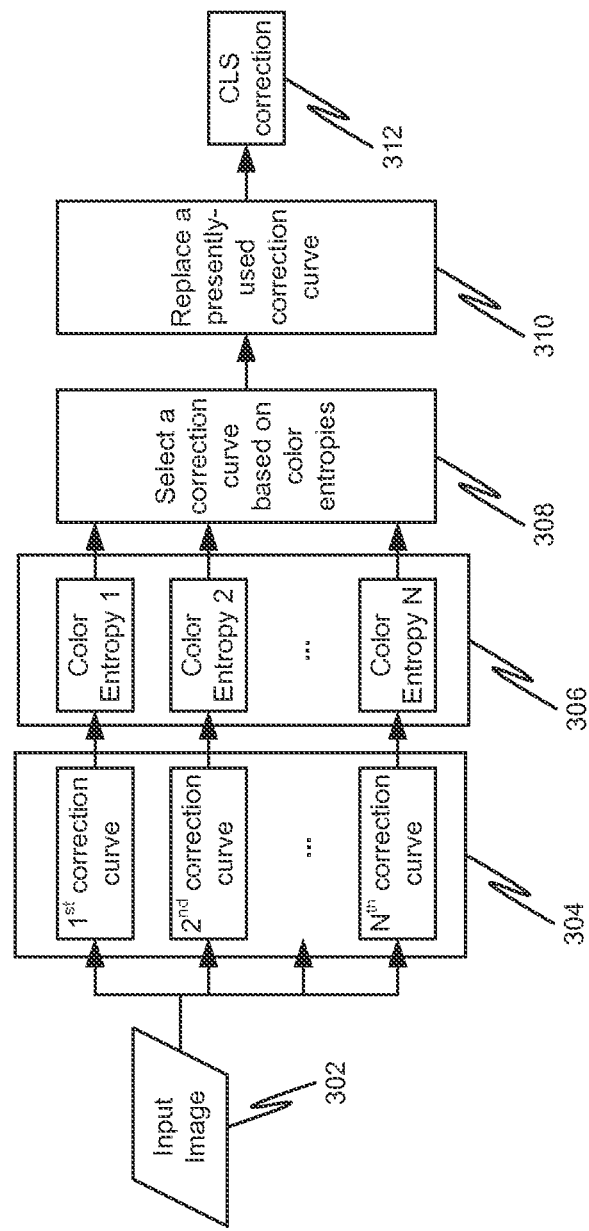
FIG. 2 depicts an example flow diagram for CLS correction using correction curves.

The CLS correction module 102 may perform correction-curve-based CLS correction using correction curves obtained through calibration. FIG. 2 depicts an example flow diagram for CLS correction using correction curves. As shown in FIG. 2, multiple correction curves are applied to input image 104 to obtain color entropies, and a correction curve corresponding to the smallest color entropy is selected for better CLS correction.

Specifically, at 302, the input image 104 is received. At 304, a plurality of correction curves (e.g., N correction curves) that are generated through calibration are applied to the input image 104 for CLS correction. Corresponding, at 306, various color entropies (e.g., N entropies) are obtained based on CLS correction using the correction curves. Different color entropies are compared. At 308, a correction curve that corresponds to a smallest color entropy is selected. At 310, the selected correction curve and a presently-used correction curve are blended to generate a new correction curve to replace the presently-used correction curve. At 312, the new correction curve is applied to the input image 104 for final CLS correction. In some embodiments, the selected correction curve can be directly applied to the input image 104 for final CLS correction. For example, the correction curves are generated from white chart images under different light sources.

Figure 3:
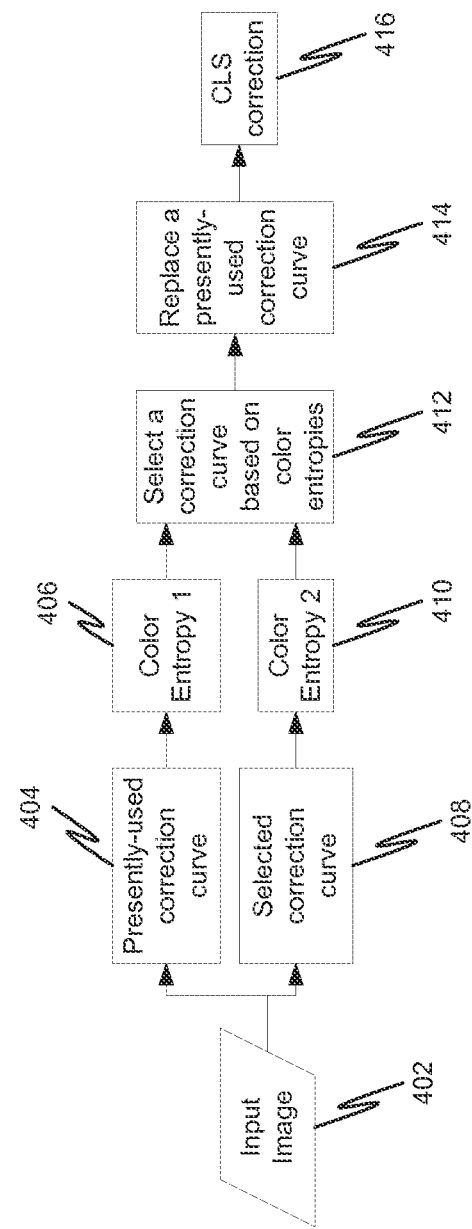
FIG. 3 depicts another example flow diagram for CLS correction using correction curves.

FIG. 3 depicts another example flow diagram for CLS correction using correction curves. As shown in FIG. 3, a first color entropy is obtained by applying a presently-used correction curve to the input image 104, and a second color entropy is obtained by selecting one of a plurality of correction curves and applying the selected correction curve to the input image 104. A new correction curve is generated based at least in part on the two color entropies for better CLS correction.

Specifically, at 402, the input image 104 is received. At 404, the presently-used correction curve is applied to the input image 104 for CLS correction. At 406, the first color entropy is obtained. At 408, one of the plurality of correction curves is selected, e.g., based on a round-robin algorithm, and is applied to the input image 104 for CLS correction. At 410, the second color entropy is obtained. At 412, the first color entropy is compared with the second color entropy, and the correction curve that corresponds to the smaller color entropy is selected. At 414, the selected correction curve and the presently-used correction curve are blended to generate a new correction curve to replace the presently-used correction curve. At 416, the new correction curve is applied to the input image 104 for final CLS correction. In some embodiments, the selected correction curve can be directly applied to the input image 104 for final CLS correction.

Weighted correction curves may be used for CLS correction. For example, a weighting factor, F, is determined as follows:

$$\sum_{i=1}^{N} F(i) = 1 \quad (7)$$

where N represents a number of original correction curves. A weighted correction curve is generated based on the weighting factor and the original correction curves.

The weighted correction curve is then applied to the input image 104 for CLS correction. Corresponding, a color entropy is obtained based on CLS correction using the weighted correction curve. The weighting factor is adjusted to reduce (e.g., minimize) the color entropy, e.g., through a Newton method. An optimal weighting factor may be obtained for optimal CLS correction.

Figure 4:
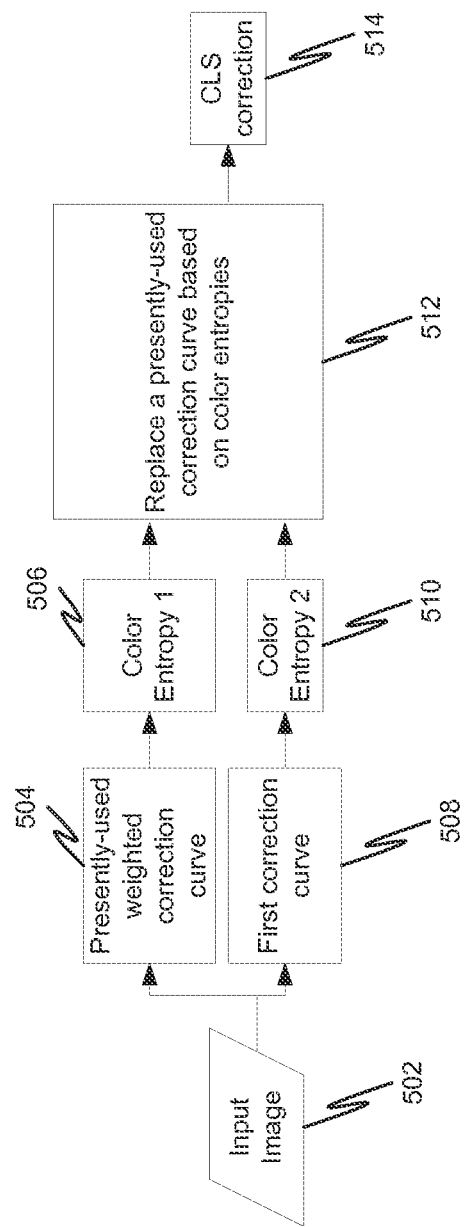
FIG. 4 depicts another example flow diagram for CLS correction using correction curves.

FIG. 4 depicts another example flow diagram for CLS correction using correction curves. As shown in FIG. 4, a first color entropy is obtained by applying a presently-used weighted correction curve to the input image 104, and a second color entropy is obtained by applying a first correction curve to the input image 104, where the first correction curve is determined by blending the presently-used correction curve and another correction curve selected from the original correction curves (e.g., through a round-robin algorithm). A correction curve is determined based on the comparison of the two color entropies for better CLS correction.

Specifically, at 502, the input image 104 is received. At 504, the presently-used weighted correction curve is applied to the input image 104 for CLS correction. At 506, the first color entropy is obtained. One of the original correction curves is selected, e.g., based on a round-robin algorithm, and is blended with the presently-used correction curve to generate the first correction curve. At 508, the first correction curve is applied to the input image 104 for CLS correction. At 510, the second color entropy is obtained. At 512, the first color entropy is compared with the second color entropy, and the correction curve that corresponds to the smaller color entropy is selected to replace the presently-used correction curve. At 514, the selected correction curve is applied to the input image 104 for final CLS correction.

Different correction curves may be obtained for different modules (e.g., different types of corner modules) in a camera. One or more corner modules may be selected based on r-g variations and/or b-g variations. For example, different corner-to-center r-g variations can be determined as follows:

Top-left corner variation: $V_{TL}=(r/g)_{TL}/(r/g)_c$

Top-right corner variation: $V_{TR}=(r/g)_{TR}/(r/g)_c$

Bottom-left corner variation: $V_{BL}=(r/g)_{BL}/(r/g)_c$

Bottom-right corner variation: $V_{BR}=(r/g)_{BR}/(r/g)_c$ where TL, TR, BL, BR, C stand for top-left, top-right, bottom-left, bottom-right, center, respectively.

A function S(A, B, C, D) is determined as follows:

$$S(A, B, C, D) = \frac{V_{TL}^A \cdot V_{TR}^B \cdot V_{BL}^C \cdot V_{BR}^D}{V_{TL}^{1-A} \cdot V_{TR}^{1-B} \cdot V_{BL}^{1-C} \cdot V_{BR}^{1-D}}, \quad (7)$$

$$A \in \{0, 1\}, B \in \{0, 1\}, C \in \{0, 1\}, D \in \{0, 1\}$$

One or more corner modules that can minimize S(0,0,0,0), S(0,0,0,1), S(0,0,1,0), ..., S(1,1,1,) may be selected. As an example, different corner-to-center b-g variations can be determined as follows:

Top-left corner variation: $V_{TL}=(b/g)_{TL}/(b/g)_c$

Top-right corner variation: $V_{TR}=(b/g)_{TR}/(b/g)_c$

Bottom-left corner variation: $V_{BL}=(b/g)_{BL}/(b/g)_c$

Bottom-right corner variation: $V_{BR}=(b/g)_{BR}/(b/g)_c$

The function S(A, B, C, D) can be determined based on the corner-to-center b-g variations, and one or more corner modules that can minimize S(0,0,0,0), S(0,0,0,1), S(0,0,1,0), ..., S(1,1,1,) may be selected. Correction curves may be obtained for these selected corner modules.

Figure 5:
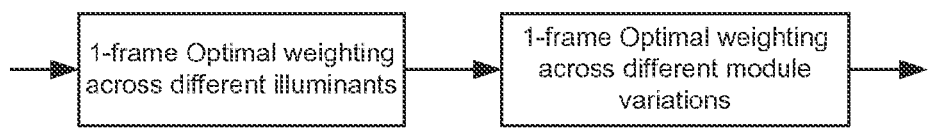
FIG. 5 depicts an example diagram showing optimal weighting for two frames.
Figure 6:
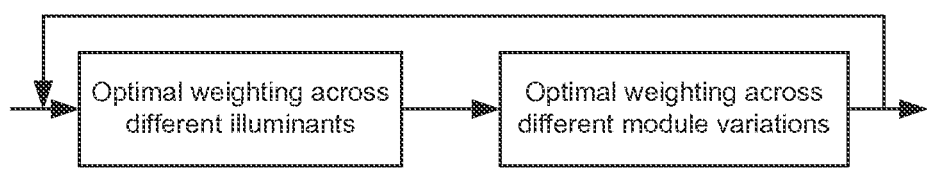
FIG. 6 depicts an example diagram showing optimal weighting for multiple frames.

In some embodiments, optimal weighting as described above may be performed across different illuminants (e.g., light sources), and then optimal weighting may be performed for different module variations. In certain embodiments, optimal weighting for different illuminants (e.g., light sources), and optimal weighting for different module variations may be interleaved and converged in a long loop cycle. FIG. 5 depicts an example diagram showing optimal weighting for two frames. FIG. 6 depicts an example diagram showing optimal weighting for multiple frames.

Figure 7:
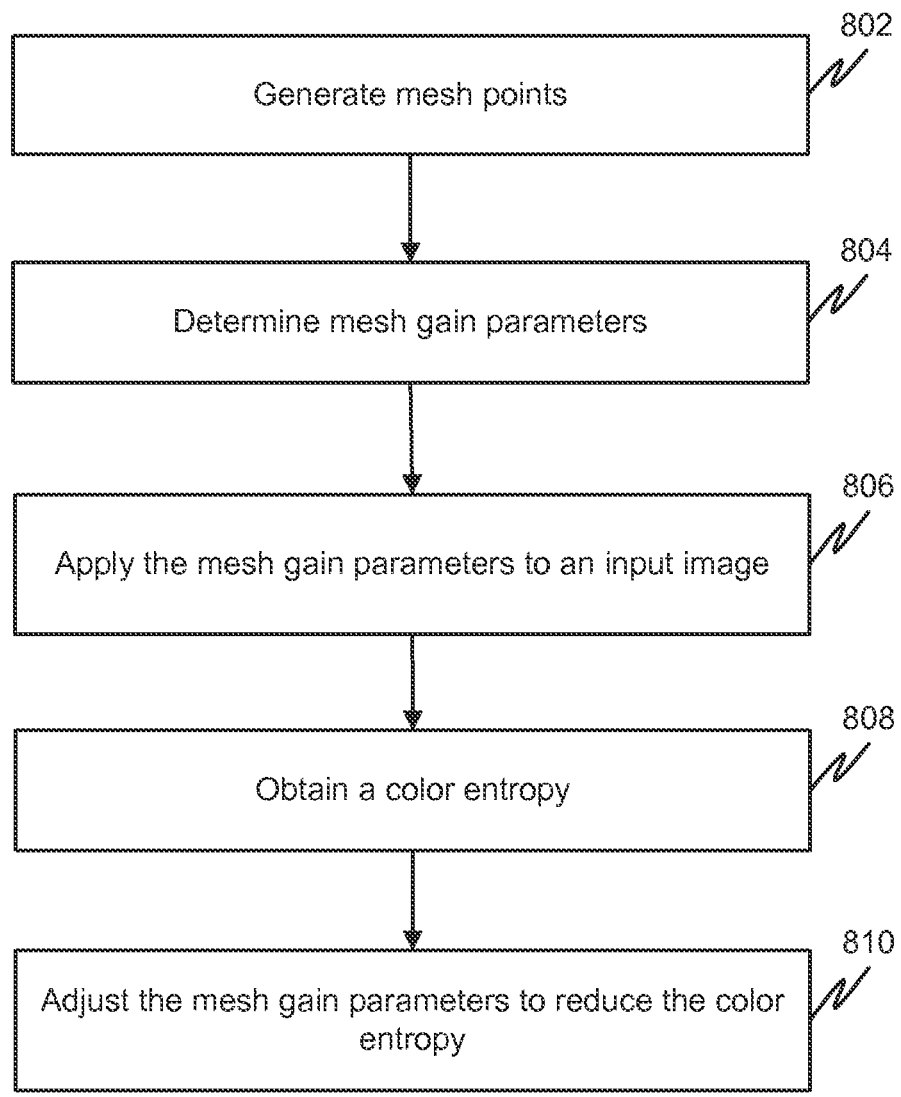
FIG. 7 depicts an example flow diagram for performing color lens shading correction.

FIG. 7 depicts an example flow diagram for performing color lens shading correction. At 802, a plurality of mesh points are generated. At 804, mesh gain parameters associated with the mesh points are determined. At 806, the mesh gain parameters are applied to an input image for color lens shading correction. At 808, a color entropy related to color distribution of the corrected input image is obtained. At 810, the mesh gain parameters are adjusted to reduce the color entropy.

Figure 8:
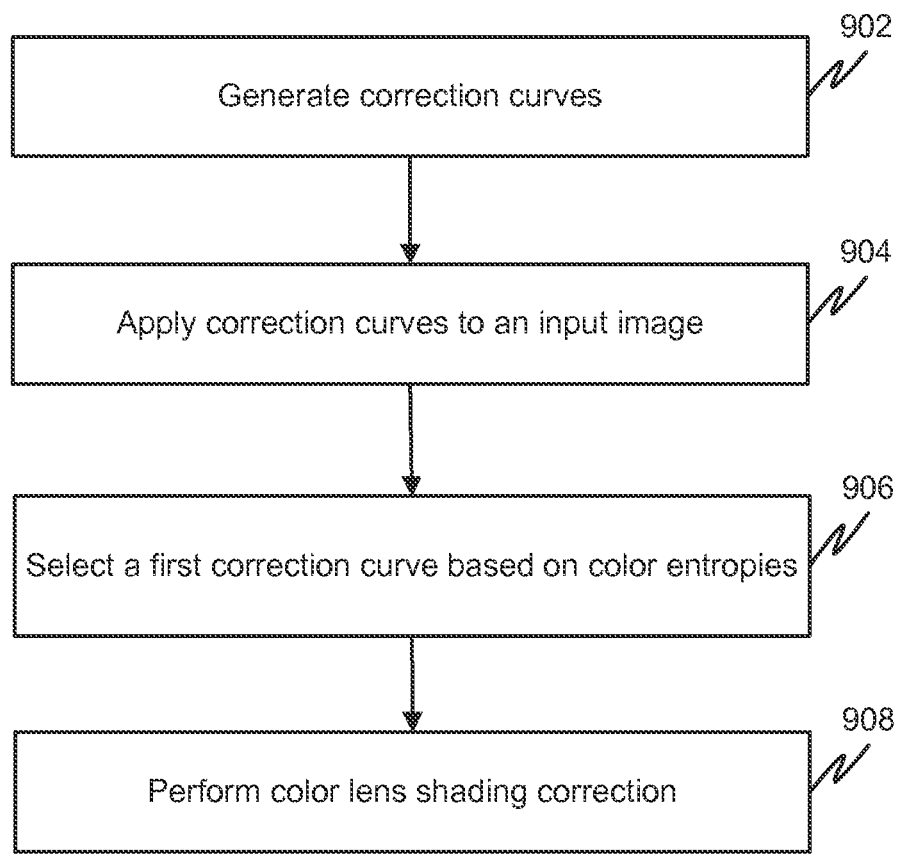
FIG. 8 depicts another example flow diagram for performing color lens shading correction.

FIG. 8 depicts another example flow diagram for performing color lens shading correction. At 902, a plurality of original correction curves are generated through calibration. At 904, the plurality of original correction curves are applied to an input image to obtain one or more color entropies, a color entropy being associated with color distribution of the input image. At 906, a first original correction curve is determined based at least in part on the color entropies. At 908, color lens shading correction is performed based at least in part on the first original correction curve. In some embodiments, the color entropies are used to evaluate color lens shading of the input image.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for performing color lens shading correction, the method comprising:
   generating a plurality of mesh points;
   determining mesh gain parameters associated with the mesh points;
   applying the mesh gain parameters to an input image for color lens shading correction;
   obtaining a color entropy related to color distribution of the corrected input image; and
   adjusting the mesh gain parameters to reduce the color entropy.

2. The method of claim 1, wherein each mesh point is associated with at least three of the mesh gain parameters, which comprise a first gain for a green channel of the associated mesh point, a second gain for a red channel of the associated mesh point, and a third gain for a blue channel of the associated mesh point.

3. The method of claim 2, wherein the first gain for the green channel is determined to be 1.

4. The method of claim 1, wherein the mesh points are generated in a grid pattern or a circle pattern.

5. The method of claim 1, wherein applying the mesh gain parameters to the input image for color lens shading correction includes:
   interpolating the mesh gain parameters to obtain channel gain parameters of an entire image related to the mesh points; and
   applying the channel gain parameters to the input image.

6. The method of claim 5, wherein the mesh gain parameters are interpolated through bi-linear interpolation, bi-cubic interpolation, or B-spline interpolation.

7. The method of claim 1, wherein the mesh gain parameters are adjusted to reduce the color entropy according to a Newton's method.

8. A method for performing color lens shading correction, the method comprising:
   generating a plurality of original correction curves;
   applying the plurality of original correction curves to an input image to obtain one or more color entropies, a color entropy being associated with color distribution of the input image;
   determining a first original correction curve based at least in part on the one or more color entropies; and
   performing color lens shading correction based at least in part on the first original correction curve.

9. The method of claim 8, wherein determining the first original correction curve based at least in part on the one or more color entropies includes:
   comparing the color entropies to determine a smallest color entropy; and
   selecting the first original correction curve that corresponds to the smallest color entropy.

10. The method of claim 8, wherein performing color lens shading correction based at least in part on the first original correction curve includes:
    generating a second original correction curve by blending the first original correction curve and a presently-used original correction curve; and
    applying the second original correction curve to the input image for color lens shading correction.

11. The method of claim 8, wherein applying the plurality of original correction curves to an input image to obtain one or more color entropies and determining a first original correction curve based at least in part on the one or more color entropies includes:
    applying a presently-used original correction curve to the input image to obtain a first color entropy;
    determining a second original correction curve among the plurality of original correction curves;
    applying the second original correction curve to the input image to obtain a second color entropy; and
    in response to the first color entropy being larger than the second color entropy, selecting the second original correction curve.

12. The method of claim 11, wherein performing color lens shading correction based at least in part on the first original correction curve includes:
    generating a third original correction curve by blending the presently-used original correction curve and the second original correction curve; and
    applying the third original correction curve to the input image for color lens shading correction.

13. The method of claim 11, wherein the second original correction curve is determined among the plurality of original correction curves according to a round-robin algorithm.

14. The method of claim 8, wherein applying the plurality of original correction curves to the input image to obtain one or more color entropies includes:
    determining a weighting factor;
    generating a first weighted correction curve based at least in part on the weighting factor and the plurality of original correction curves; and
    applying the first weighted correction curve to the input image to obtain a first color entropy.

15. The method of claim 14, wherein:
    determining the weighting factor includes: adjusting the weighting factor to reduce the first color entropy; and
    the first original correction curve corresponds to the first weighted correction curve.

16. The method of claim 8, wherein applying the plurality of original correction curves to the input image to obtain one or more color entropies includes:
    determining a weighting factor;
    applying a presently-used weighted correction curve to the input image to obtain a first color entropy, the presently-used weighted correction curve being generated based at least in part on the weighting factor and a presently-used original correction curve;
    determining a second original correction curve among the plurality of original correction curves;
    generating a third correction curve by blending the second original correction curve and the presently-used original correction curve;
    applying the third correction curve to the input image to obtain a second color entropy; and
    in response to the first color entropy being larger than the second color entropy, applying the third correction curve to the input image for color lens shading correction.

17. The method of claim 8, wherein the plurality of original correction curves are generated through calibration using white chart images under different light sources.

18. The method of claim 8, wherein the one or more color entropies are used to evaluate color lens shading of the input image.

19. A system for performing color lens shading correction, the system comprising:
  one or more data processors; and
  a non-transitory computer-readable storage medium encoded with instructions for commanding the data processors to execute operations including:
  generating a plurality of mesh points;
  determining mesh gain parameters associated with the mesh points;
  applying the mesh gain parameters to an input image for color lens shading correction;
  obtaining a color entropy related to color distribution of the corrected input image; and
  adjusting the mesh gain parameters to reduce the color entropy.

20. A system for performing color lens shading correction, the system comprising:
  one or more data processors; and
  a non-transitory computer-readable storage medium encoded with instructions for commanding the data processors to execute operations including:
  generating a plurality of correction curves through calibration;
  applying the plurality of correction curves to an input image to obtain one or more color entropies, a color entropy being associated with color distribution of the input image;
  selecting a first correction curve based at least in part on the color entropies; and
  performing color lens shading correction based at least in part on the first correction curve.

* * * * *